May 13, 1947.  J. R. DUNNIHOO  2,420,588
PLURAL WAY VALVE
Filed Nov. 5, 1942  2 Sheets-Sheet 2
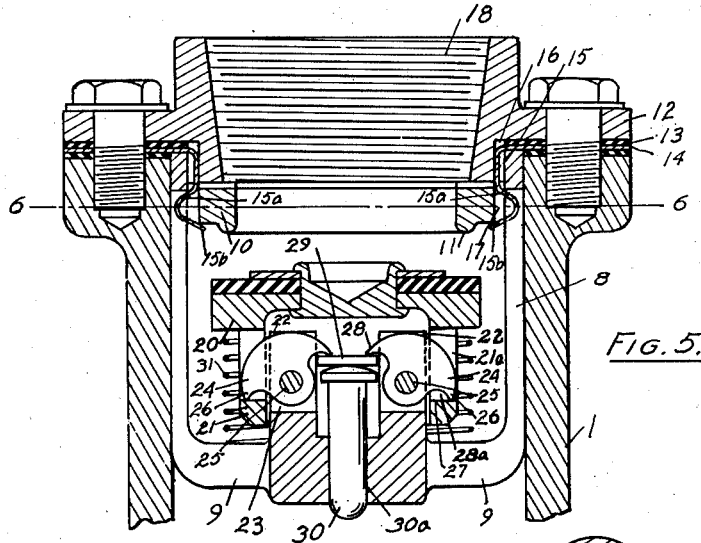
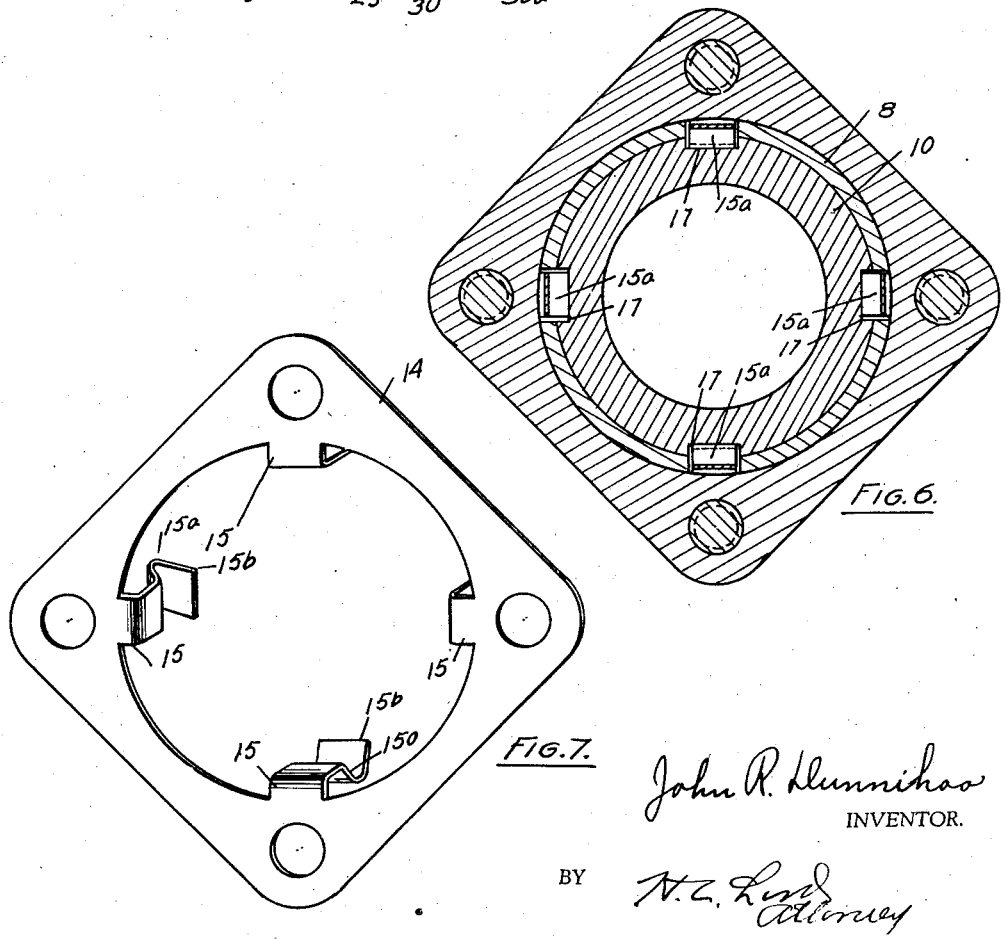
John R. Dunnihoo
INVENTOR.
BY Patented May 13, 1947

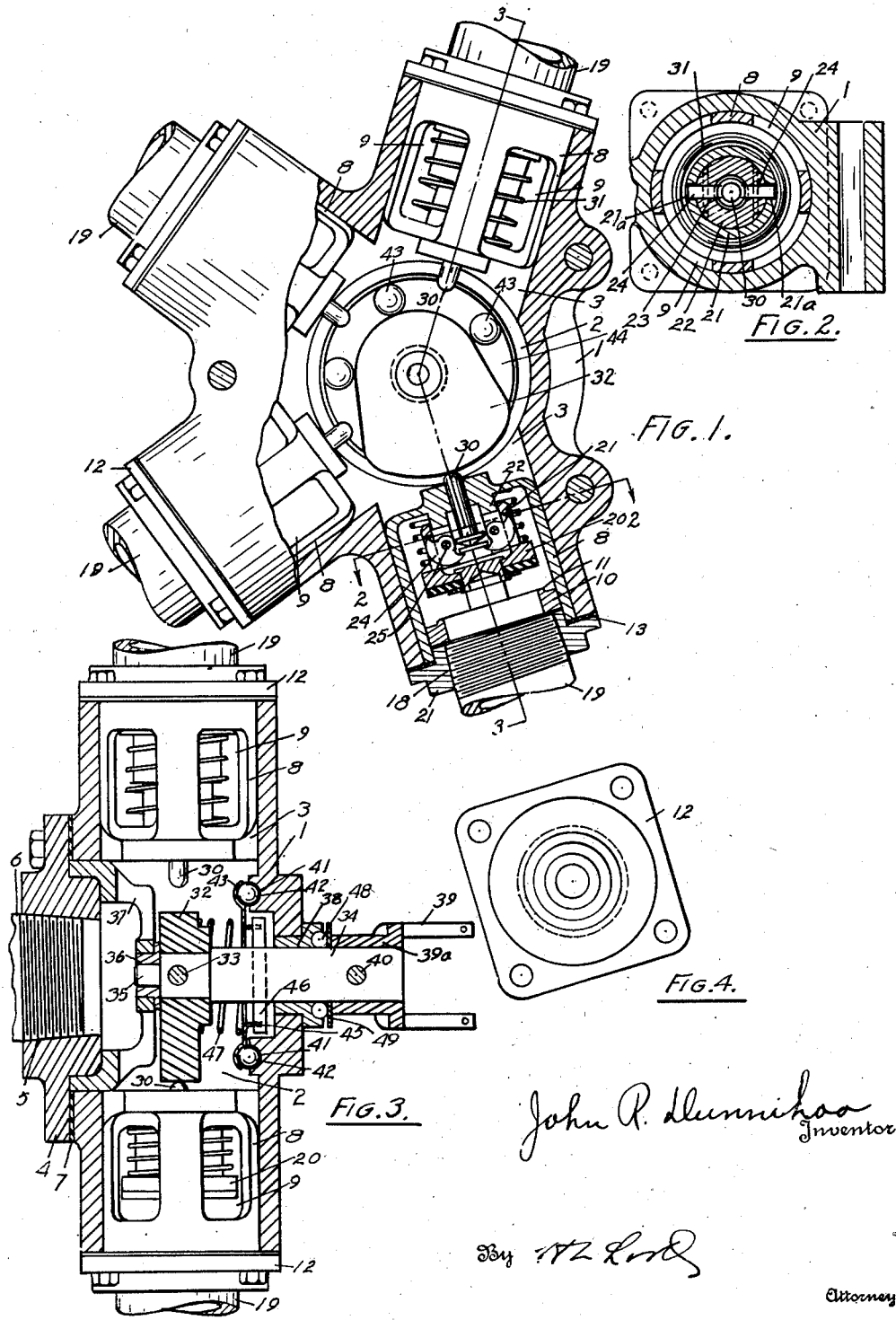

2,420,588

UNITED STATES PATENT OFFICE 2,420,588

PLURAL WAY VALVE

John Russell Dunnihoo, Corry, Pa., assignor, by mesne assignments, to Rohlm Manufacturing Company, Incorporated, Erie, Pa., a corporation of Kansas Application November 5, 1942, Serial No. 464,639

6 Claims. (Cl. 277—20)

The present invention is directed to the improvement of plural way valves, more particularly plural way valves controlled by valve members of the poppet-valve type.

The invention contemplates a group of such valve members with selective control mechanism providing for a flow from or to a common passage.

In carrying out the invention the valves are preferably seated by a movement in a direction outwardly from the common passage and are operated by an actuating mechanism by which the desired branches may be selectively controlled.

The invention also contemplates valve assemblies which may be assembled as units in the valve mechanism as a whole, thus simplifying both the manufacture and the servicing of the valve mechanism.

Further features and details of the invention will appear from the specification and claims.

A preferred embodiment of the invention is illustrated in the accompanying drawings as follows:

Fig. 1 shows an elevation, partly in section.

Fig. 2 a section on the line 2—2 in Fig. 1.

Fig. 3 a section on the line 3—3 in Fig. 1.

Fig. 4 an end view on port fitting.

Fig. 5 an enlarged view of the valve assembly in section in the same plane as Fig. 1.

Fig. 6 a section on the line 6—6 in Fig. 5.

Fig. 7 a detached view of a spring attaching ring.

1 marks the body of the valve. This has a central or intermediate chamber 2 with a way 3 leading radially therefrom. As shown, there are four of these ways or branches, and they are similarly spaced. A space is left between two of the ways which is double the spacing of the other ways providing a neutral position for the control. The intermediate chamber 2 is closed at one end by a cover plate 4 secured to the body by cap screws. The cover plate is provided with a screw threaded opening 5 receiving a pipe connection 6. The cover plate is sealed by a gasket 7 which is arranged between the plate and the face of the body.

Valve cages 8 are arranged in the ways 3. These cages have radially and axially extending openings 9. Valve rings 10 are slidingly mounted in the cages, the valve rings having inwardly faced seats 11. Cover plates 12 are secured to the body at the ends of the ways by cap screws, and sealed by gaskets 13. Spring rings 14 are arranged between the valve rings and covers. These spring rings have axially extending fingers 15. These fingers have outward bends 15a and inward projections 15b. The cover plates have slots 16 on their outer peripheries to provide clearance for the fingers 15. The valve rings 10 also have registering slots 17 for receiving these fingers. The fingers spring sufficiently to permit the assembly of the spring ring with the valve rings and covers. The bends 15a extend into the ends of the openings 9 and the projections 15b overlap the face of the valve ring. This spring connection, therefore, holds the assembly yieldingly together. It is only necessary that the spring ring hold the valve seats in place as the pressure of the valve as it is seated crowds the valve ring toward the cover plate. The cover plates have screw threaded openings 18 to receive branch pipes 19. Valve heads 20 have guide sleeves 21 which extend over projections 22 extending upwardly from the bottom of the cage. Radial slots 23 are arranged in the projections 22. Rockers 24 are pivotally secured in the slots by means of pins 25. The rockers extend into slots 21a in the guide sleeves. The outer ends 26 of the rockers engage the lower ends 27 of slots 28a in the guide sleeves 21, and the inner ends 28 of the rockers engage bearing plates 29 on the ends of valve operating stems 30. The stems 30 extend through guide openings 30a in the bottoms of the cages and project into the intermediate chamber 2.

Springs 31 are seated on the bottoms of the cages and engage the inner faces of the valve heads. The springs are of sufficient strength to close the valves against inward pressure through the way if the flow is inward.

In the operation of the valves, when the stems 30 are crowded outwardly, these stems operating through the rockers force the valves inwardly against the springs 31 and any outward exerting fluid pressure if the flow is outward.

An eccentrically shaped cam 32 is locked by a pin 33 on an axially extending shaft 34. The shaft has a bearing projection 35 which extends into a bearing 36 supported by a bearing plate 37, the bearing plate being mounted in the outer end of the chamber 2 and locked in position by the cover plate 4. The shaft 34 is also supported by a bearing 38 arranged in the body of the valve, and an operating connection 39 is provided with a sleeve 39a which is locked with the shaft 34 by means of a pin 40. As shown, the connection 39 may be attached to a control extension or handle by means of which the shaft may be rotated to open or close the valves as desired.

In order that the proper selection of ways may be controlled, a yielding locking mechanism is provided. Detents 41 are arranged around the end wall of the chamber 2. Balls 42 are arranged in these detents and engage detents 43 in a plate 44. The plate 44 has projections 45 extending axially from the plate and these are engaged by a cross pin 46 in the shaft 34. The plate, except for the slots formed by the in-bending of the projections 45, has a sliding fit on the shaft 34.

A spring 47 is arranged around the shaft 34 between the cam and the plate 44 so that there is a continuous tendency to draw the shaft toward the left and to yieldingly press the plate 44 so as to hold the detents on the balls and thus lock the mechanism in the selected positions for controlling the selected valve or at neutral. This end thrust of the spring 47 on the shaft 34 is sustained by balls 48 arranged in the end of the bearing 38, the ball operating against a washer 49 at the end of the sleeve 39a.

In the structure as shown there are five detents making five equally spaced positions, four of these being in positions to hold a selected valve open and one of these positioned to hold the cam in neutral position.

From this description it will be noted that the valve mechanism forms a detachable assembly which can be readily fabricated separately from the valve body. This is of advantage not only in the original manufacture of the valve, but also a very definite advantage in servicing the valve as the entire assembly may be removed and replaced.

By making the valve close against an agreed flow from the intermediate chamber, any cross flow from one of the branch ways to another is obviated in a normal operation of the apparatus in that with any pressure tending to cause a flow into any other than the selected way, that flow will tend to and effect a closure of the valve.

What I claim as new is:

1. A plural way valve comprising a body having an intermediate chamber and a plurality of ways leading therefrom, valve assemblies mountable as units in said ways, each comprising a valve slidable inward and outward, a cage loosely surrounding the sides and ends of the valve having an inwardly facing seat engaged by outward movement of the valve, a spring between the valve and cage urging the valve outward against the seat, and an operating member projecting into the intermediate chamber for moving the valve inward against the spring.

2. A plural way valve comprising a body having an intermediate chamber and a plurality of ways leading therefrom, valve assemblies mountable as units in said ways, each comprising a valve slidable inward and outward, a cage loosely surrounding the sides and ends of the valve having an inwardly facing seat engaged by outward movement of the valve, a spring between the valve and cage urging the valve outward against the seat, and means operating from the intermediate chamber controlling the valve including a radially extending stem slidable in the cage and devices communicating outward movement of the stem to move the valve inward.

3. A plural way valve comprising a body having an intermediate chamber and a plurality of ways leading therefrom, valve assemblies mountable as units in said ways, each comprising a valve slidable inward and outward, a cage loosely surrounding the sides and ends of the valve having an inwardly facing seat engaged by outward movement of the valve, a spring between the cage and valve urging the valve against the seat, a radially extending stem slidable in the cage, a rocker engaging the stem and valve for moving the valve inward upon outward movement of the stem, and a cam in the intermediate chamber for selectively moving the stems outward.

4. A plural way valve comprising a body having an intermediate chamber and a plurality of ways leading therefrom, valve assemblies mountable as units in the ways, each comprising a valve slidable inward and outward, a cage loosely surrounding the sides and ends of the valve and having an inwardly facing valve seat movable outwardly in the cage, a cover plate covering the end of the way and providing a means for a fluid connection, and a surface on the cover plate against which the seat is urged by the valve.

5. In a valve, an assembly mountable as a unit in a way comprising a valve slidable inward and outward, a cage loosely surrounding the sides and ends of the valve, an inwardly facing valve seat loosely held by the cage and engaged by outward movement of the valve, a cap closing the way and providing means for a fluid connection, and a seating surface on the cap against which the valve seat is urged by the valve.

6. In a valve, an assembly mountable as a unit in a way comprising a valve slidable inward and outward, a cage loosely surrounding the sides and ends of the valve and including a valve seat engaged by outward movement of the valve, a spring between the valve and cage urging the valve against the seat, and a valve operating member slidable in the cage for moving the valve away from the seat.

JOHN R. DUNNIHOO.

REFERENCES CITED

The following references are of record in the file of this patent:

UNITED STATES PATENTS

| Number | Name | Date |
|---|---|---|
| 974,938 | Wetrous | Nov. 8, 1910 |
| 1,146,012 | Mason | July 13, 1915 |
| 2,232,597 | Downey | Feb. 18, 1941 |
| 2,299,615 | Downey | Oct. 20, 1942 |
| 2,219,982 | Downey | Oct. 29, 1940 |

FOREIGN PATENTS

| Number | Country | Date |
|---|---|---|
| 611,167 | France | June 28, 1926 |